Inventor
C. P. Leggett

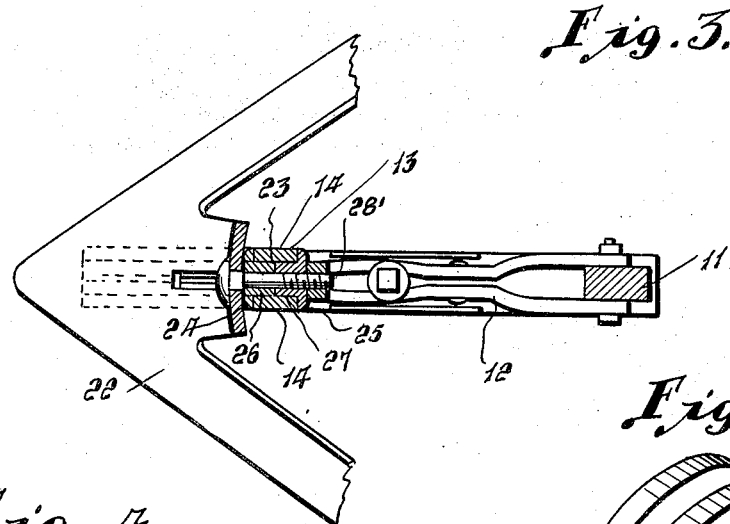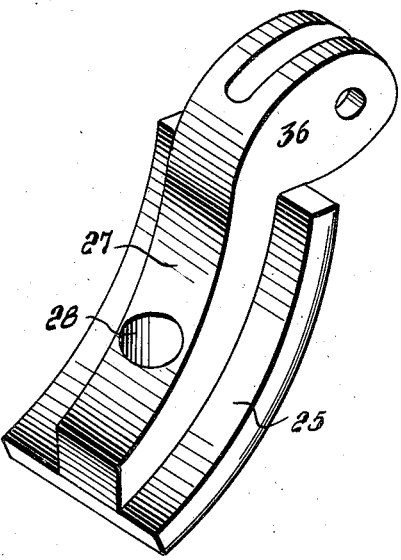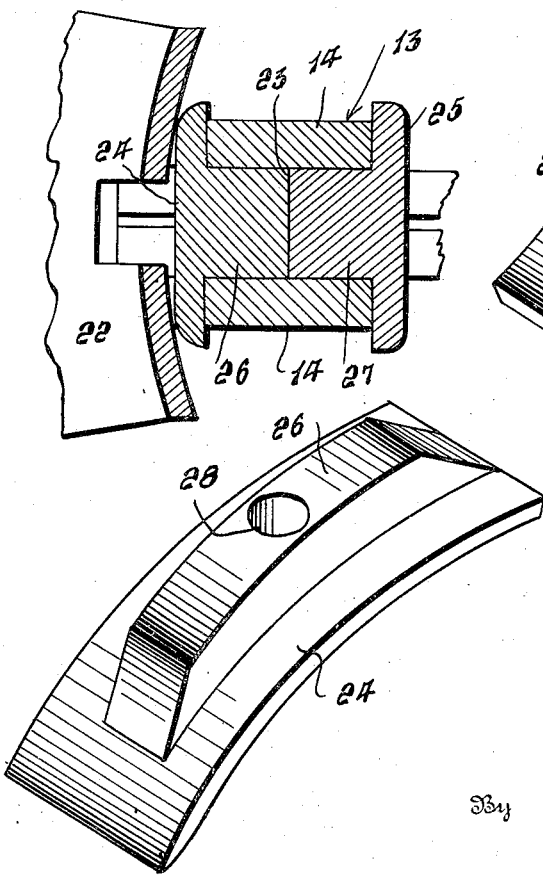

Patented Oct. 3, 1939

2,174,829

UNITED STATES PATENT OFFICE 2,174,829

ATTACHMENT FOR PLOWS

Cohen P. Leggett, Fairmont, N. C.

Application February 10, 1938, Serial No. 189,866

10 Claims. (Cl. 97—110)

This invention relates to a device for raising and lowering the plowshare by means of a lever.

Heretofore it has been customary when necessary to change the elevation of a plowshaft to remove the bolts, securing the share to the standard, and thereafter adjusting the share on the standard to the new elevation desired after which the share is again bolted in position. As it is sometimes necessary to frequently adjust the plow due to the varying conditions of the earth, the above procedure readily results in considerable loss of time.

It is an aim of this invention to provide means whereby the share may be slidably mounted on the standard and connected to means carried by the plow whereby the elevation can be varied at will without stopping the plow, and without disconnecting the share.

A further object of the invention is to provide a lever and latch means connected to the plowshare to raise and lower the share by a swinging movement of the lever and to retain the share in adjusted position by means of the latch.

A further object of the invention is to provide an improved frog capable of rigidly supporting the share on the standard, yet so constructed that the frog may be moved relatively to the standard, when actuated by the lever, without binding.

Still another object of the invention is to provide a device as heretofore described adapted for use with a pivotally mounted standard having means for varying the angle of the plowshare.

Figure 1:
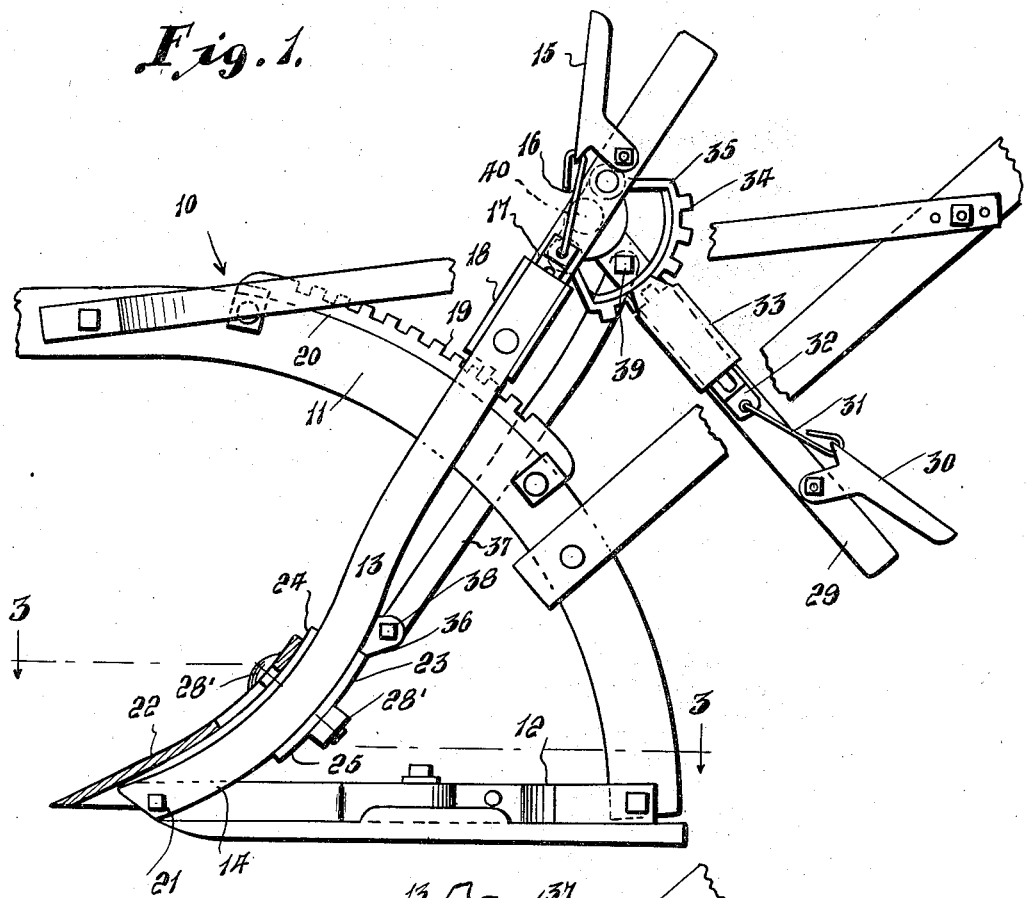
Figure 2:
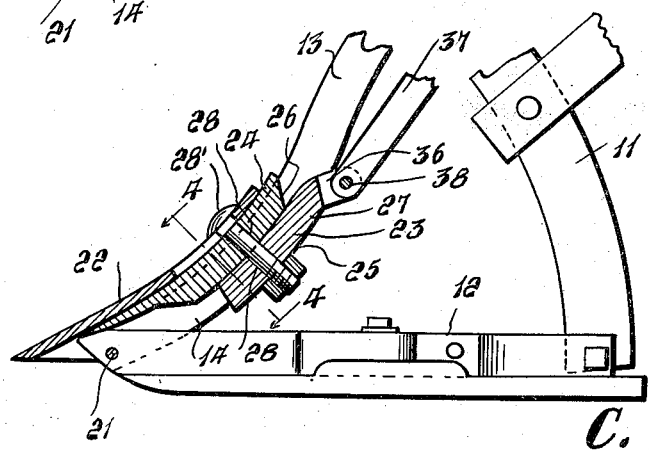

Other objects and advantages of the invention will hereinafter become more fully apparent from the following description of the drawings, which illustrate a preferred form of the invention, and wherein;

Figure 1 is a fragmentary side elevational view of the rear portion of a plow showing the invention applied thereto, Figure 2 is a fragmentary view of the lower portion of a plow including the lower part of the plow standard, having the frog, shown in section, and forming part of this invention, shown attached thereto, Figure 3 is a horizontal sectional view taken on the line 3—3 of Figure 1, Figure 4 is a sectional view taken on the line 4—4 of Figure 2, Figure 5 is an enlarged perspective view of the rear half of the frog, and Figure 6 is a corresponding view of the front half of the frog.

Referring more particularly to the drawings wherein like reference characters designate like or corresponding parts throughout the different views, 10 designates generally the rear portion of a conventional plow having means for angular adjustment of the plowshare, and shown to illustrate an application of the invention. The portion of the plow 10 as shown includes the rear downturned end 11 of the beam, the slide 12 secured to the beam and pivotally connected to the lower end of the standard 13. The standard 13 comprises the corresponding spaced parallel bars 14 as best seen in Figure 3, which are connected to opposite sides of the slide 12, and which extend on opposite sides of the beam 11. A latch handle 15 is pivotally connected to the upper part of standard 13 and is connected by a wire 16 to a sliding pawl 17 adapted to be actuated by a spring, not shown, contained in the casing 18 to normally engage the teeth 19 of the bar 20, which is secured to the upper edge of the beam 11. Thus, when handle 15 is compressed to raise the pawl 17 out of engagement with teeth 19, the standard 13 may be swung from the pivot point 21 to vary the angle of the plowshare 22, and by releasing handle 15 the share 22 will be retained in its adjusted position. It is to be understood that these parts which have heretofore been described are all of conventional form and constitute no part of this invention and are not intended to limit or restrict the invention which will now be described.

This invention relates to an apparatus for readily adjusting the elevation of the share 22 and for locking the share in adjusted position, and comprises the frog 23 which includes the front plate 24 and the rear plate 25, as best seen in Figures 5 and 6 respectively. As seen in Figures 5 and 6 the plates 24 and 25 are each curved to correspond to the curve of the standard 13, and are provided with the ribs 26 and 27 respectively, which extend longitudinally of the plates.

As best seen in Figure 4 plates 24 and 25 are adapted to engage against the opposite edges of the bars 14, and the ribs 26 and 27 are adapted to extend into the space between the bars with their adjacent faces abutting to prevent the plates 24 and 25 from binding against the edges of bars 14. These plates and bars are provided with the openings 28 which are adapted to be in alignment, when the frog 23 is assembled on the standard 13 to receive a fastening 28' to attach the frog to the standard, and also to attach the plowshare 22 to the front face of the plate 24.

A lever 29 is connected at its end to the upper part of the standard 13, and projects rearwardly therefrom. A latch mechanism comprising a latch handle 30 pivotally mounted adjacent the free end of lever 29 and connected by a wire 31 to a sliding pawl or pin 32 mounted in a housing 33 containing a spring, not shown, to normally urge pawl 32 into engagement with the teeth 34 of a quadrant 35 secured to the standard 13, is provided to retain the lever in adjusted positions. These parts correspond to the parts 15 to 20 heretofore described, and are adapted to retain the lever 29 in a plurality of adjusted positions.

The rib 27 is elongated to form a lug or ear 36 extending rearwardly and upwardly, and slotted to receive one end of a link 37 to which it is pivotally connected by the pin 38. The opposite end of link 37 is pivotally connected by the pin 39 to the lever 29 intermediate of its ends.

From the foregoing it will be obvious, that when handle 30 is compressed the lever 29 may be swung on its pivot 40 either upwardly or downwardly to thereby raise or lower frog 23 and plowshare 22 which are connected to the lever by the link 37. On releasing the handle 30 the pawl 32 will be projected into engagement with the teeth 34 to lock the lever 29 against movement thereby retaining frog 23 and share 22 in adjusted position on the standard 13. In this way, the elevation of the share 22 may be varied without removing it, or loosening it on the standard 13.

While the invention has been described in combination with a plow having means for angular adjustment of the share, the apparatus could obviously be attached to any other form of plow standard, and a slot could be provided in a solid standard to receive the ribs 26 and 27 and to permit them to slide relatively to the standard. Various other modifications and changes may obviously be made not only in the application of the invention, but also in its construction and arrangement of parts, and the right is expressly reserved to make such variations as do not depart from the spirit and scope of the invention as hereinafter defined by the appended claims.

I claim as my invention:

1. In a plow, a standard formed of spaced bars, a frog formed of sections loosely disposed between the bars to be slidably mounted in said standard and having an ear projecting rearwardly therefrom, a lever connected to the upper part of said standard and projecting rearwardly therefrom, a link pivotally connecting said ear and lever to cause said frog to be raised and lowered by movement of the lever, and latch means associated with said lever to retain the frog in adjusted position.

2. In a device of the class described, a plow standard, a plowshare slidably mounted on said standard, a lever carried by said standard and connected to said plowshare, said share adapted to be moved longitudinally of the standard by a swinging movement of the lever to vary its elevation, and a latch carried by said lever to engage a toothed-quadrant on said standard to retain the lever and share in adjusted position.

3. In combination with an angularly adjustable slotted plow standard, a frog mounted to slide longitudinally in the slot of said standard and adapted to be rigidly secured to a plowshare, a lever mounted on the upper end of said standard and extending rearwardly therefrom, a link connecting said frog and lever for vertical adjustment of the frog and share by movement of the lever, a toothed-quadrant carried by the standard, and a spring projected latch carried by the lever and releasable to engage said teeth of said quadrant to retain the frog and lever in adjusted position.

4. In combination with a pivotally mounted plow standard for angular adjustment of a plow-share, a lever carried by said standard and connected to the plowshare to adjust its elevation relatively to the standard, and latch means associated with said lever and adapted to retain the share in adjusted position.

5. In a plow, a standard comprising spaced parallel bars, a frog comprising a pair of plates shaped to engage the opposite edges of said bars, said plates having inwardly projecting rib portions to engage between said bars with their adjacent faces abutting, fastening means to slidably mount said frog on the standard, and adapted to secure a plowshare to one of said plates, and a lever pivotally mounted above said frog and connected thereto to adjust the elevation of the plowshare.

6. In combination with a plow standard formed of spaced parallel bars, a frog slidably mounted on said standard and adapted to support a plow-share, said frog comprising a pair of plates engaging the opposite edges of said bars and having inwardly projecting ribs extending between said bars with their adjacent faces abutting to permit said frog to slide relatively to the standard, and fastening means extending through the plates and ribs to connect the parts.

7. A device as in claim 6, a lever pivotally mounted at one end on the plow, a link connected to said frog and to the intermediate portion of the lever, to adjust the elevation of the share, a toothed-quadrant carried by the plow, and a latch carried by the lever to normally engage the quadrant to retain the share in adjusted position.

8. A device as in claim 6, said standard being pivotally mounted at its lower end, and latch means for retaining said standard in adjusted position.

9. A plow comprising a standard formed of spaced bars pivotally mounted at their lower ends, a frog slidably mounted between said bars, fastening means for removably supporting a plow share on said frog, means for adjustably supporting said frog relatively to the standard for adjusting the elevation of the plow share, and means for angularly adjusting said standard for adjusting the angle of the plow share.

10. In a plow, a toothed-bar mounted on a plow beam, a standard, provided with a longitudinal slot, pivotally mounted at its lower end, a frog slidably mounted in the slot of said standard and adapted to support a plow share, a latch member mounted adjacent the upper free end of said standard for releasably engaging said toothed-bar, for angularly adjusting the standard and plow share, a lever pivotally connected to said standard adjacent its upper end, a link connecting said lever and frog for adjusting the elevation of said plow share, and latch means for retaining said frog in adjusted position relatively to the standard.

COHEN P. LEGGETT.